(12) United States Patent
Matsumoto et al.

(10) Patent No.: US 6,287,022 B1
(45) Date of Patent: *Sep. 11, 2001

(54) INDICATED STATE CHANGING PIN AND METHOD OF BENDING INDICATING PIECES

(75) Inventors: Nobuo Matsumoto; Izumi Seto, both of Kanagawa (JP)

(73) Assignee: Fuji Photo Film Co., Ltd., Kanagawa (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/811,973

(22) Filed: Mar. 5, 1997

(30) Foreign Application Priority Data

Mar. 8, 1996 (JP) .................................................. 8-051901

(51) Int. Cl.⁷ ...................................................... G03B 17/26
(52) U.S. Cl. ................................................................ 396/515
(58) Field of Search .................................... 396/429, 511, 396/512, 515, 513, 661, 538, 578; 242/338, 344

(56) References Cited

U.S. PATENT DOCUMENTS

| | | | |
|---|---|---|---|
| 4,647,170 | * | 3/1987 | Stoneham ............................. 396/538 |
| 4,682,870 | * | 7/1987 | Atkinson .............................. 396/515 |
| 4,791,504 | * | 12/1988 | Igarashi et al. ....................... 242/338 |
| 5,122,820 | * | 6/1992 | Pagano et al. ....................... 396/538 |
| 5,404,188 | * | 4/1995 | Takahashi et al. .................... 396/538 |
| 5,475,454 | * | 12/1995 | Ezawa .................................. 396/207 |
| 5,506,650 | * | 4/1996 | Stephenson, III et al. .......... 396/512 |
| 5,552,849 | * | 9/1996 | DiRisio et al. ...................... 396/515 |
| 5,570,152 | * | 10/1996 | Kaya .................................... 396/515 |
| 5,602,611 | * | 2/1997 | Takatori et al. ...................... 396/513 |
| 5,689,733 | * | 11/1997 | Zawodny et al. ........................ 396/6 |

* cited by examiner

*Primary Examiner*—David M. Gray
(74) *Attorney, Agent, or Firm*—Sughrue, Mion, Zinn, Macpeak & Seas, PLLC

(57) ABSTRACT

An indicated state changing pin which abuts indicating pieces of a cartridge, which indicate the state of a photographic film accommodated within the cartridge, and bends the indicating pieces, wherein a proximal end portion of the indicated state changing pin is formed larger than a distal end portion of the indicated state changing pin. Therefore, since the indicating pieces are bent while abutting the indicated state changing pin, even if the moving speed of the indicated state changing pin is constant, the indicating pieces are bent slower than the case of using a linearly-formed straight pin. As a result, separation of the indicating pieces from the cartridge is prevented, and the indicating pieces are reliably bent to the necessary depth.

11 Claims, 15 Drawing Sheets

F I G. 5
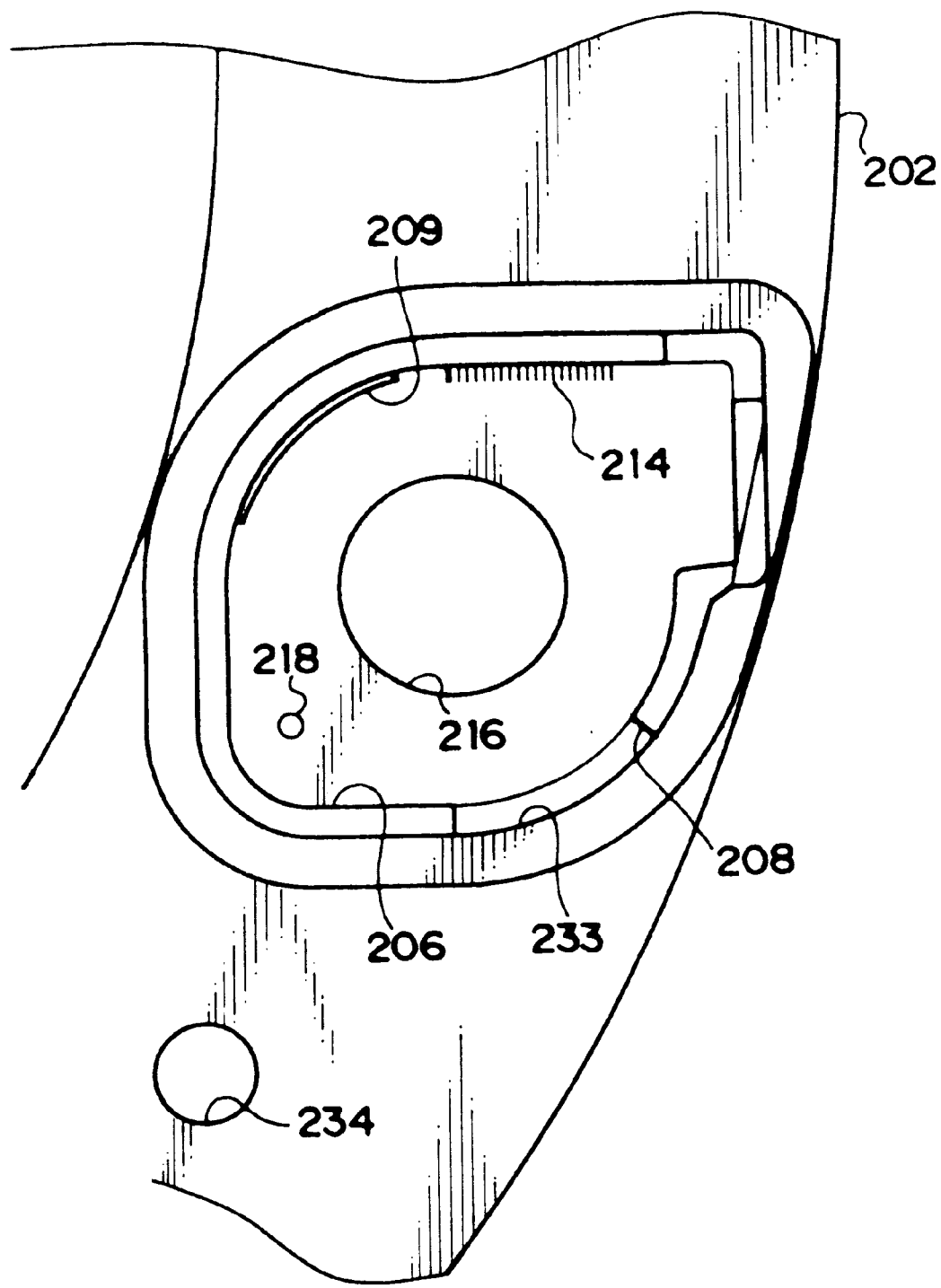

F I G. 6
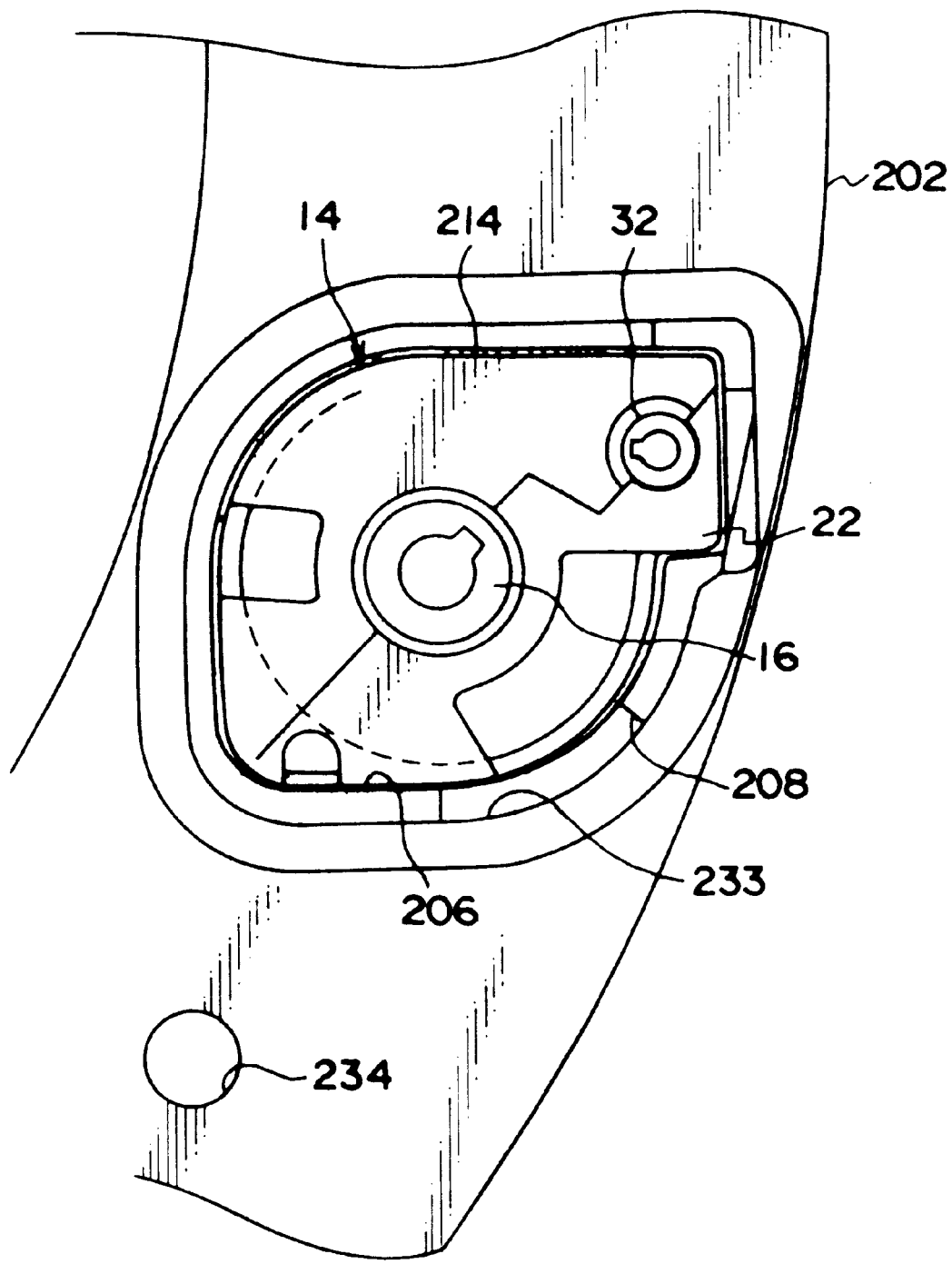

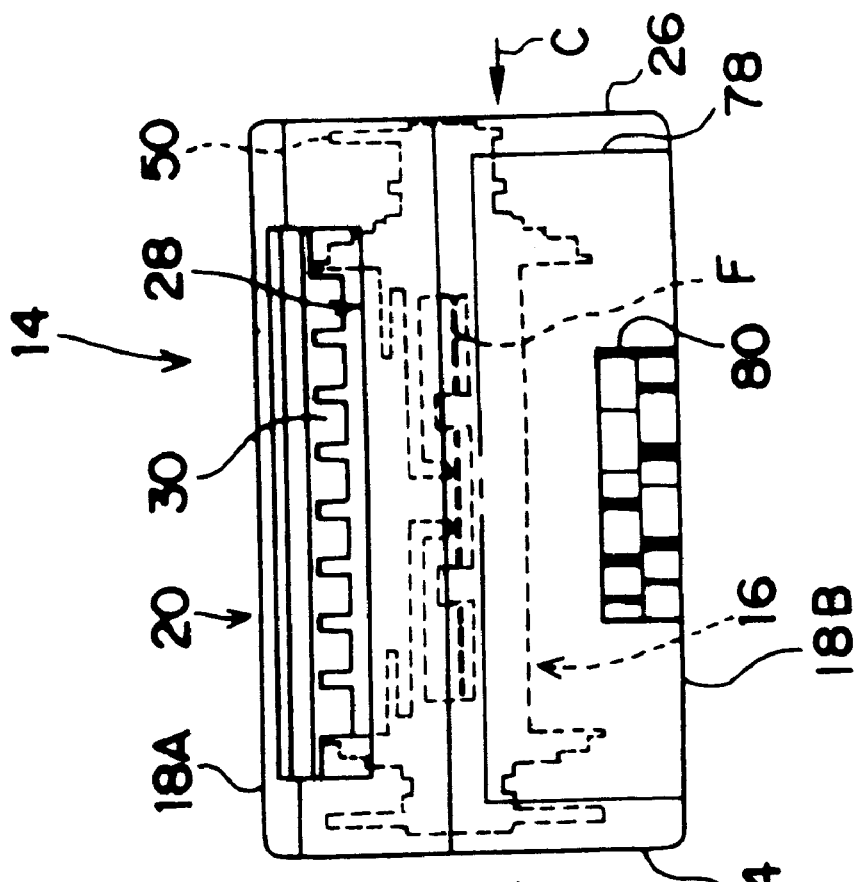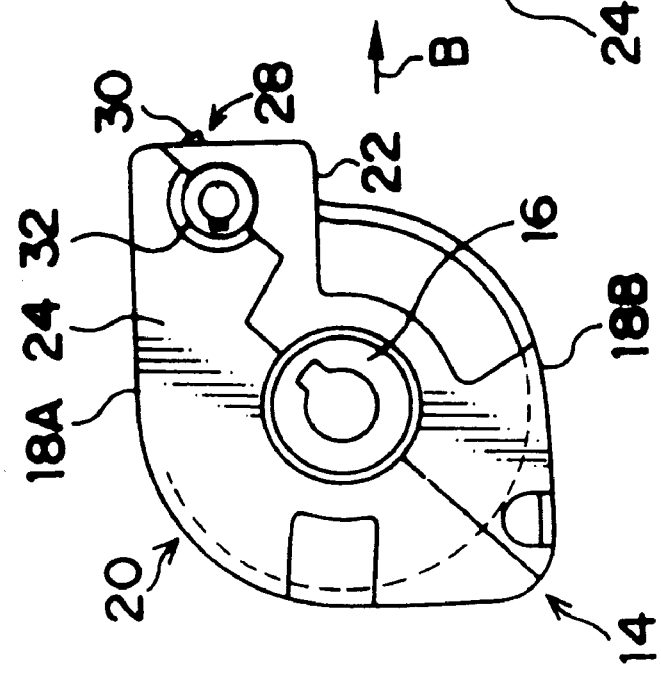

INDICATED STATE CHANGING PIN AND METHOD OF BENDING INDICATING PIECES

BACKGROUND OF THE INVENTION

1. Field of the Invention

The present invention relates to an indicated state changing pin and a method of bending indicating pieces, in which the indicating pieces are provided on a cartridge and indicate the undeveloped state of a photographic film accommodated within the cartridge.

2. Description of the Related Art

Conventionally, after pictures are photographed, a negative film, which is one type of a photographic film, is taken to a processing laboratory in a state in which the negative film is taken up onto a case such as a cartridge. At the processing laboratory, the negative film, which has been taken up onto the cartridge, is withdrawn therefrom and developed. Thereafter, the negative film is loaded into a film carrier which is provided at a photographic printer such as a printer processor. Then, a print processing is effected so that images recorded on the negative film are printed onto a photographic printing paper. Accordingly, photographic prints are produced.

The developed negative film is cut every predetermined image frames (e.g., every six frames) so as to form a piece negative which can be accommodated within a negative sheet. The negative film is returned to a customer together with the photographic prints.

In recent years, in order to facilitate processings at the second print processing and the like, it has been considered that the developed negative film is returned to the customer in a state in which the negative film is taken up onto the cartridge without being cut.

In this way, when the negative film is returned in a state in which it is taken up onto the cartridge, indicating pieces which indicate the existence of a developed negative film within the cartridge may be provided on the cartridge. Since the cartridge itself is generally formed by a resin, the indicating pieces are formed integrally with the cartridge by the resin.

As a result, when the indicating pieces are pressed by a linearly-formed straight pin to a necessary depth and deformed so that the indicating pieces are bent, the indicating pieces, which are formed integrally with the cartridge by the resin, are separated from the cartridge and may become trash.

SUMMARY OF THE INVENTION

With the aforementioned in view, an object of the present invention is to provide an indicated state changing pin and a method of bending indicating pieces, in which, even if the indicating pieces are formed by a material having low strength such as a resin material, the indicating pieces are reliably bent to a necessary depth and in which separation of the indicating pieces from a cartridge is prevented.

The indicated state changing pin according to a first aspect of the present invention is an indicated state changing pin which abuts indicating pieces of a cartridge, which indicate the state of a photographic film accommodated within the cartridge, and bends the indicating pieces, wherein a proximal end portion of the indicated state changing pin is formed larger than a distal end portion of the indicated state changing pin.

The operation of the indicated state changing pin according to the first aspect will be explained.

The indicated state changing pin abuts the indicating pieces of the cartridge, which indicate the state of the photographic film accommodated within the cartridge, and bends the indicating pieces. Further, the indicated state changing pin is formed so that the proximal end portion of the indicated state changing pin is larger than the distal end portion thereof.

Because the indicating pieces are bent while abutting the side surface of the indicated state changing pin, which is between the proximal end portion and the distal end portion, even if the moving speed of the indicated state changing pin is constant, the indicating pieces are bent slower than the case of using a linearly-formed straight pin. Accordingly, the speed at which the indicating pieces are deformed is reduced so that the indicating pieces are bent slowly. As a result, separation of the indicating pieces from the cartridge is prevented, and the indicating pieces are reliably bent to the necessary depth.

The indicated state changing pin according to a second aspect is an indicated state changing pin which abuts indicating pieces of a cartridge, which indicate the state of a photographic film accommodated within the cartridge, and bends the indicating pieces, wherein the indicated state changing pin is truncated in which the proximal end portion is larger than the distal end portion.

The operation of the indicated state changing pin according to the second aspect will be explained.

The indicated state changing pin abuts the indicating pieces of the cartridge, which indicate the state of the photographic film accommodated within the cartridge, and bends the indicating pieces. Further, the indicated state changing pin is truncated so that the proximal end portion of the indicated state changing pin is larger than the distal end portion thereof.

Similarly to the above-described first aspect, because the indicating pieces are bent while abutting the side surface of the indicated state changing pin, which is between the proximal end portion and the distal end portion, the speed at which the indicating pieces are deformed is reduced so that the indicating pieces are bent slowly. Consequently, separation of the indicating pieces from the cartridge is prevented, and the indicating pieces are reliably bent to the necessary depth.

The indicated state changing pin according to a third aspect is an indicated state changing pin which abuts indicating pieces of a cartridge, which indicate the state of a photographic film accommodated within the cartridge, and bends the indicating pieces, wherein the distal end portion of the indicated state changing pin is formed in the shape of an arc.

The operation of the indicated state changing pin according to the third aspect will be explained.

The indicated state changing pin abuts the indicating pieces of the cartridge, which indicate the state of the photographic film accommodated within the cartridge, and bends the indicating pieces. The indicated state changing pin is formed in the shape of an arc.

Because the indicating pieces are bent while abutting the arc-shaped surface of the indicated state changing pin, similarly to the first aspect, even if the moving speed of the indicated state changing pin is constant, the indicating pieces are bent slower than the case of using a linearly-formed straight pin. As a result, the speed at which the indicating pieces are deformed is reduced so that the indicating pieces are bent slowly. Thus, separation of the indicating pieces from the cartridge is prevented, and the indicating pieces are reliably bent to the necessary depth.

The method of bending the indicating pieces according to a fourth aspect is a method of bending indicating pieces of a cartridge which indicate the state of a photographic film accommodated within the cartridge, comprising the steps of: moving relatively the indicating pieces and an indicated state changing pin, which can change the indicated states of the indicating pieces, so that the indicated state changing pin abuts the indicating pieces; and reducing the speed of relative movement after the indicated state changing pin abuts the indicating pieces with respect to the speed before the abutment, and bending the indicating pieces.

The operation of the method of bending the indicating pieces according to the fourth aspect will be explained.

The indicating pieces and the indicated state changing pin relatively move so that the indicated state changing pin abuts the indicating pieces of the cartridge, which indicate the state of the photographic film accommodated within the cartridge. Further, the speed of relative movement after the indicated state changing pin abuts the indicating pieces is reduced with respect to the speed before the abutment, such that the indicated state changing pin bends the indicating pieces. Thus, the indicated states of the indicating pieces are changed.

Since the speed of relative movement after the indicated state changing pin abuts the indicating pieces is reduced with respect to the speed before the abutment, the speed at which the indicating pieces are deformed is slower so that the indicating pieces are bent slowly. Separation of the indicating pieces from the cartridge is prevented, and the indicating pieces are reliably bent to the necessary depth.

The method of bending the indicating pieces according to a fifth aspect is a method of bending indicating pieces of a cartridge which indicates the state of a photographic film accommodated within the cartridge, comprising the steps of: firstly heating at least base ends of the indicating pieces; and in the heated state, abutting an indicated state changing pin, which can change the indicated states of the indicating pieces, on the indicating pieces and bending the indicating pieces.

The operation of the method of bending the indicating pieces according to the fifth aspect will be explained.

Firstly, at least the base ends of the indicating pieces of the cartridge, which indicate the state of the photographic film accommodated within the cartridge, are heated. In the heated state, the indicated state changing pin, which can change the indicated states of the indicating pieces, abuts and bends the indicating pieces.

Since the indicated state changing pin abuts the indicating pieces in a state in which at least the base ends of the indicating pieces are heated, the base ends of the indicating pieces are easily bent. As a result, separation of the indicating pieces from the cartridge is prevented, and the indicating pieces can be reliably bent to the necessary depth.

BRIEF DESCRIPTION OF THE DRAWINGS

FIG. 5 is an enlarged view which, seen from the axial direction of the container, shows a cartridge accommodating portion of the container relating to the embodiment of the present invention.

FIG. 6 is an enlarged view which, seen from the axial direction of the container, shows the cartridge accommodating portion of the container relating to the embodiment of the present invention in a state in which the cartridge is accommodated.

FIG. 7A is a left side view of the cartridge relating to the embodiment of the present invention.

FIG. 7B is an elevational view of the cartridge in FIG. 7A.

DESCRIPTION OF THE PREFERRED EMBODIMENTS

An indicated state changing pin and a method of bending indicating pieces in accordance with a first embodiment of the present invention will be explained on the basis of FIGS. 1 through 12.

Figure 8:
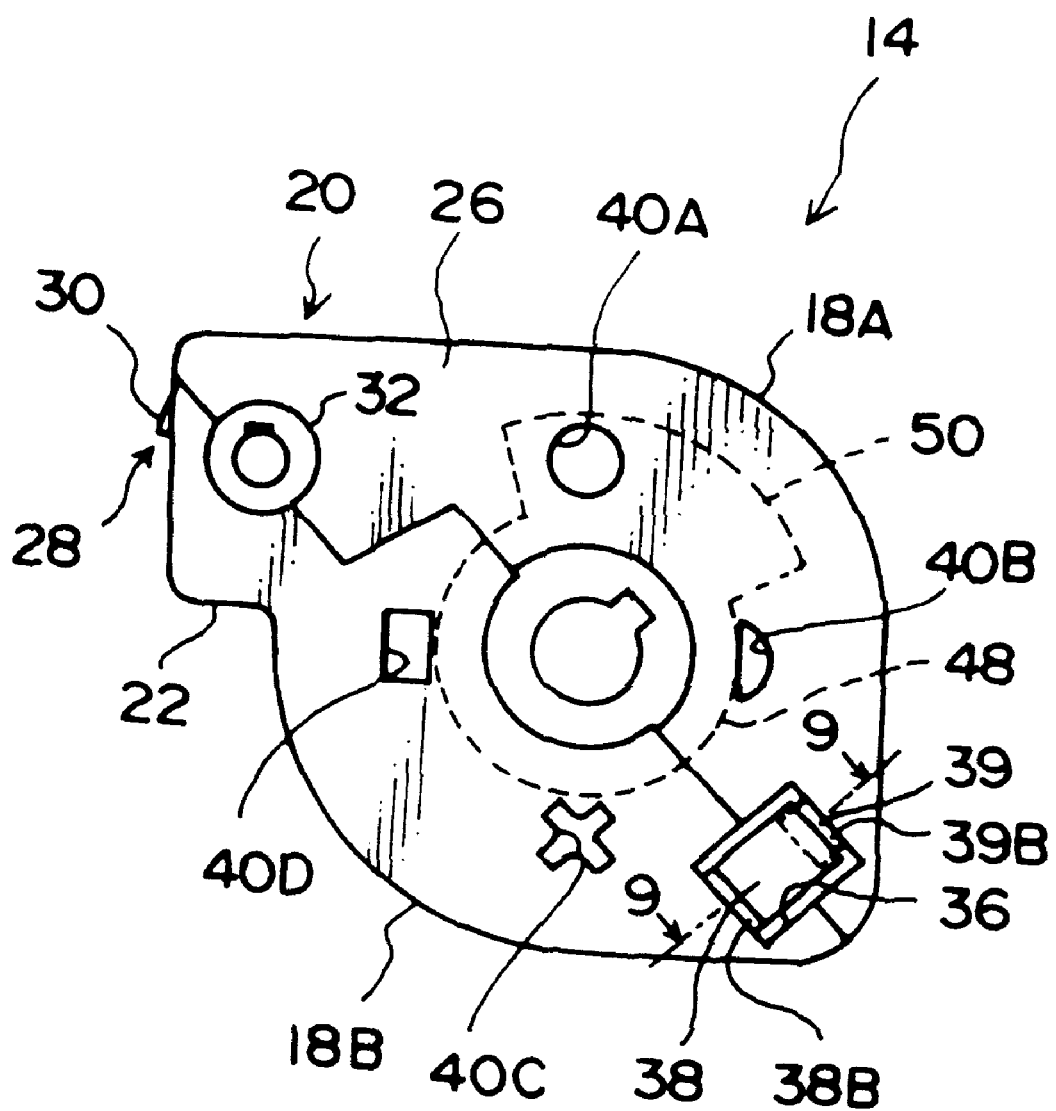
FIG. 8 is a right side view of the cartridge relating to the embodiment of the present invention, seen from the direction of arrow C in FIG. 7B.

Overviews of a cartridge 14 and a negative film F, to which the first embodiment is applied, are explained with reference to FIGS. 7A, 7B and 8. As illustrated in FIGS. 7A and 8, the cartridge 14 includes a casing 20, which is made of a synthetic resin and is formed into a substantially cylindrical shape by overlapping covers 18A, 18B. The casing 20 includes a projecting portion 22 which projects from the outer circumference of the casing 20 in the tangential direction thereof. A slit-shaped insertion opening 28, which runs along the axial direction of the casing 20, is formed at the distal end of the projecting portion 22. The insertion opening 28 is usually closed by a door 30 such that the interior of the casing 20 is shaded. Further, a spool shaft 16, which removably engages one end of the negative film F, within the casing 20 is rotatably supported at side walls 24, 26, which close both ends, in the axial direction, of the casing 20.

As illustrated in FIGS. 7A and 8, a door shaft 32 is suspended between the side walls 24 and 26 and is rotatably supported thereat. The door shaft 32 rotates integrally with the door 30, so that the door 30 rotates together with the door shaft 32 and opens/closes the insertion opening 28.

The casing 20 is formed by the covers 18A, 18B which are divided along a line connecting the position at which the door shaft 32 is supported by the side walls 24, 26, the position at which the spool shaft 16 is supported and the end portion of the side opposite the projecting portion 22.

From the above descriptions, the negative film F is removably accommodated within the cartridge 14. By opening the door 30 of the insertion opening 28, the negative film F is conveyed out of the cartridge 14.

On the other hand, as shown in FIG. 8, at the end portion of the side opposite the projecting portion 22 of the side wall 26 of the casing 20, a notch opening 36 having, for example, a depth of 4 mm is formed by a notch formed at the covers 18A, 18B. An indicating piece 38, which has, for example, a depth of 3.3 mm and which base end side is connected to the cover 18B via a connecting portion 38B so as to cover the notch opening 36, is extended along the cover 18B.

Moreover, at a location of the cover 18A which opposes the indicating piece 38, an auxiliary indicating piece 39, which base end side is connected to the cover 18A via a connecting portion 39B, is extended toward the indicating piece 38. The distal end portion of the indicating piece 38 is supported by the auxiliary indicating piece 39 from the inner side of the notch opening 36. Since the indicating piece 38 is supported by the auxiliary indicating piece 39, the indicating piece 38 will not be bent accidentally.

Figure 9:
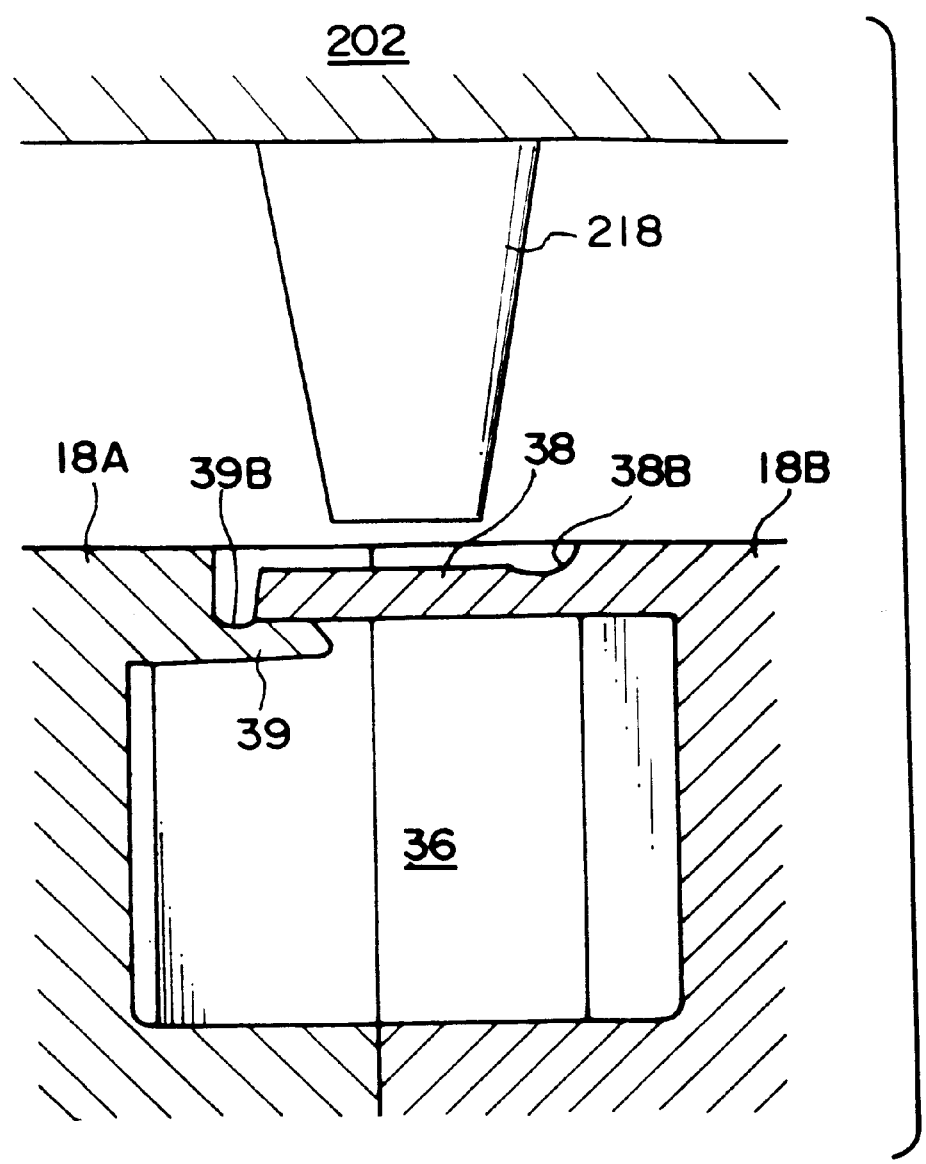
FIG. 9 is an enlarged cross-sectional view which, corresponding to the cross section of a line 9—9 in FIG. 8, shows the peripheries of the cartridge and a pin relating to the first embodiment.
Figure 10:
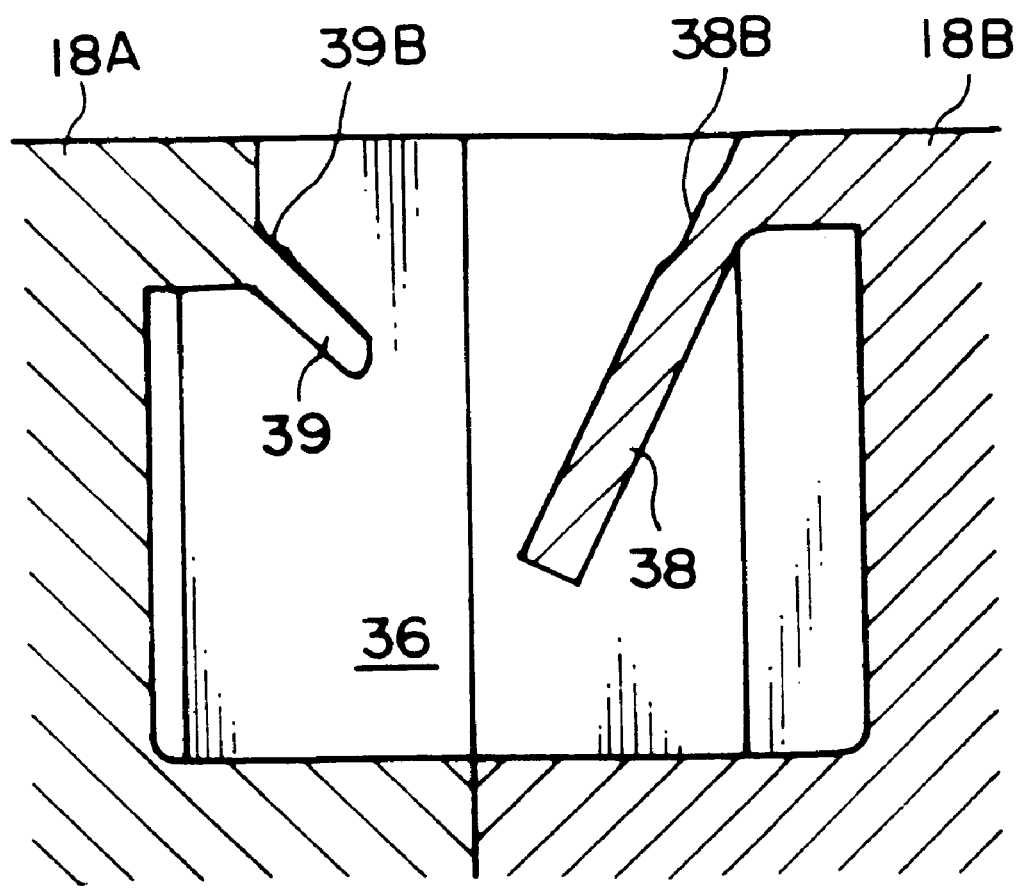
FIG. 10 is an enlarged cross-sectional view which, similar to FIG. 9, shows a state in which the indicating pieces are bent.

When an undeveloped negative film F is accommodated within the cartridge 14, the indicating piece 38 and the auxiliary indicating piece 39 are set to a state shown in FIG. 9. When a developed negative film F is accommodated within the cartridge 14, as illustrated in FIG. 10, the indicating piece 38 and the auxiliary indicating piece 39 are pressed and bent to the interior of the notch opening 36.

As a result, it can be determined from the outer side of the casing 20 as to whether the negative film F within the cartridge 14 has undergone development processing or not.

Further, indication openings 40A, 40B, 40C, 40D are punched at the side wall 26 at equal intervals along the periphery of the spool shaft 16. These indication openings 40A, 40B, 40C, 40D are used to indicate the state of the negative film F accommodated within the cartridge 14. For example, the circular indication opening 40A indicates that the negative film F is unexposed; the semi-circular indication opening 40B indicates that the negative film F is partially exposed; the X-shaped indication opening 40C indicates that the negative film F is exposed and undeveloped; and the rectangular indication opening 40D indicates that the negative film F is developed. Accordingly, the exposure state or processing state of the negative film F accommodated within the cartridge 14 can be determined.

Moreover, a ring 48 having a small diameter is mounted to the spool shaft 16 so as to oppose the end portion of the side wall 26 side of the casing 20. As illustrated in FIG. 8, a white plate 50, which projects a predetermined width outwardly in the radial direction thereof, is formed integrally at the ring 48. As illustrated in FIG. 8, the white plate 50 overlaps any one of the indication openings 40A–D depending on the rotational position around the spool 16 and the white portion is exposed at the interior of the overlapped indication opening 40A–D. The processing state of the film F within the cartridge 14 is clearly indicated in accordance with the exposure position of the white plate 50.

As illustrated in FIG. 7B, a label 78 is stuck to the outer circumferential surface of the casing 20. As illustrated in FIG. 7B, at the label 78, two stages (two rows) of a bar code 80, which includes a cartridge ID (identification number) for identifying the cartridge 14, are printed on the cover 18B side.

Next, a particular description is given of a container 200 to which the present embodiment is applied.

Figure 1:
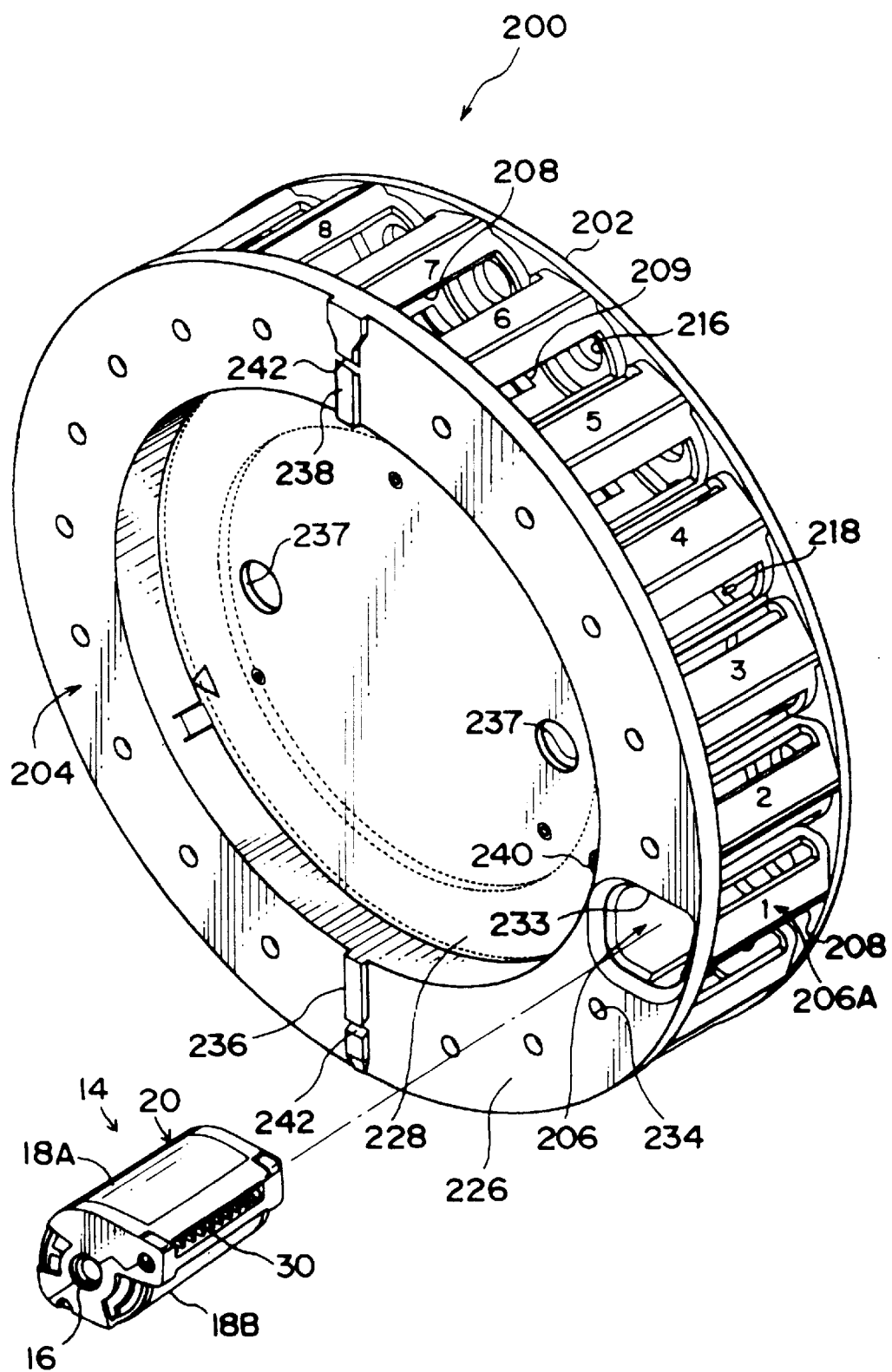
FIG. 1 is a perspective view which shows a container and a cartridge relating to an embodiment of the present invention.
Figure 2:
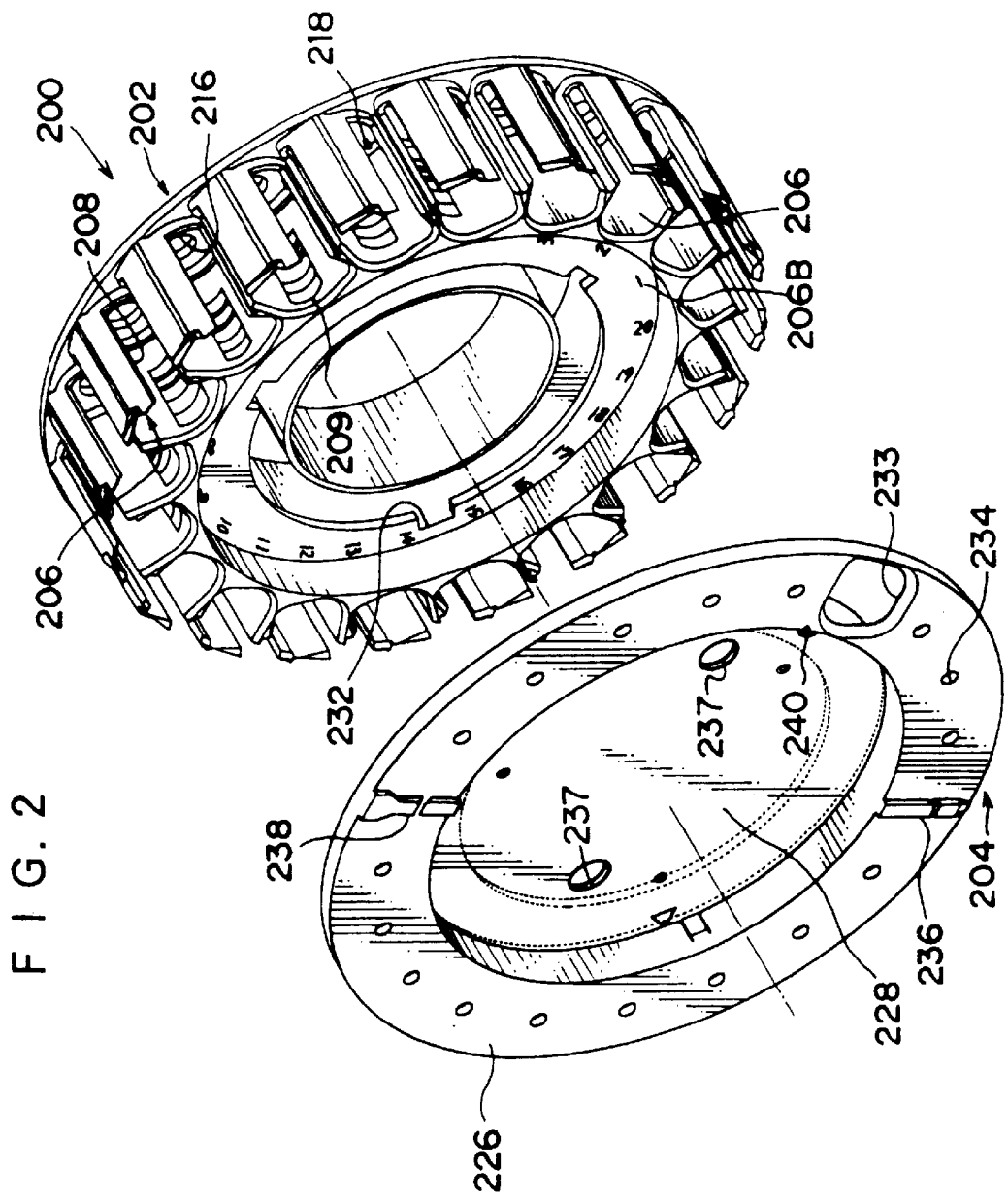
FIG. 2 is an exploded perspective view which, seen from a cover side, shows the container relating to the embodiment of the present invention.
Figure 3:
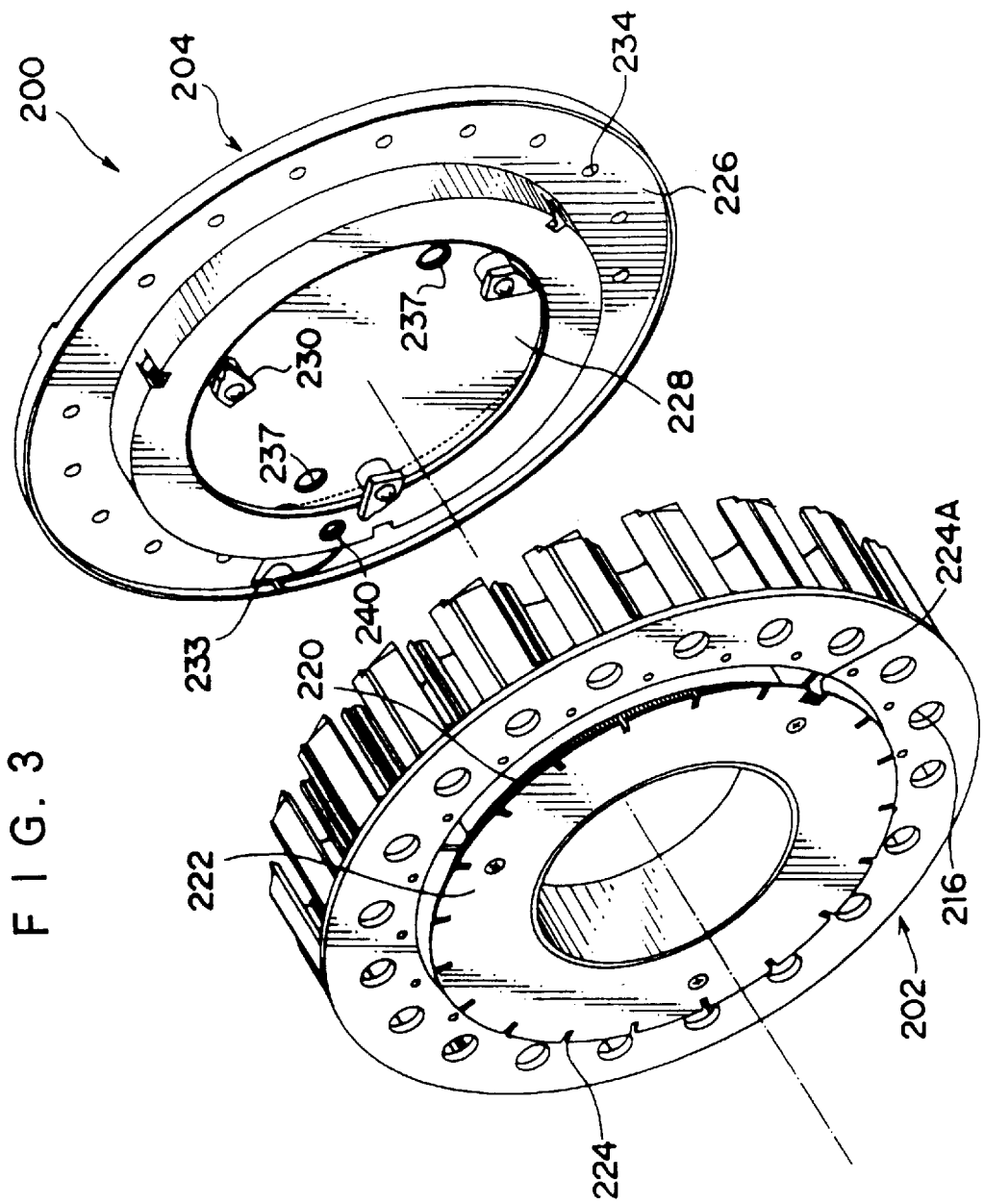
FIG. 3 is an exploded perspective view which, seen from a main body side, shows the container relating to the embodiment of the present invention.

As shown in FIGS. 1 through 3, the container 200 is formed by a main body 202 and a cover 204 which is removable from the main body 202. The main body 202 and the cover 204 are formed by a synthetic resin.

As shown in FIG. 2, the main body 202 is cylindrical, and twenty cartridge accommodating portions 206 for accommodating the cartridges 14 are provided at the outer circumferential side of the main body 202 at predetermined intervals. One end of the cartridge accommodating portion 206 is formed open so that the cartridge 14 can be inserted along the axial direction of the cartridge accommodating portion 206 from the cover 204 side.

From this structure, a leader(unillustrated) is loaded in the container 200 so as to read the bar code 80 from a predetermined angle. Accordingly, while the cartridge 14 is accommodated within the container 200, the cartridge ID can be read by rotating the container 200. As a result, there is no need to change and drive an optical axis, which is provided at the leader side, for reading two rows of bar code 80.

Namely, in order to see the bar code 80 of the accommodated cartridge 14, a window 208, which is provided by opening a wall near the outer circumferential side of the main body 202, is formed at each of the cartridge accommodating portions 206. As illustrated in FIG. 1, an accommodation number 206A (1 through 20 in the present embodiment) of the cartridge accommodating portion 206 is applied to the vicinity of the window 208.

As illustrated in FIG. 2, a bar code 209 is stuck to the inner wall surface of the cartridge accommodating portion 206 and includes information indicating that the cartridge 14 is not accommodated.

Therefore, when the bar code 209 is read, it can be determined that the cartridge 14 is not accommodated within the cartridge accommodating portion 206.

As illustrated in FIG. 5, on the inner wall surface of the cartridge accommodating portion 206 and at the position on the side of the bar code 209, a cartridge presser 214 serving as a cartridge pressing portion is provided. As illustrated in FIG. 6, the cartridge presser 214 presses the cartridge 14, which is accommodated within the cartridge accommodating portion 206, toward an opposite inner wall surface by predetermined force, such that, even if the container 200 is turned upside down, the cartridge 14 does not jump out therefrom accidentally.

As the cartridge presser 214, for example, an elastic material such as a plate spring, a sponge or the like can be used. A material having large friction such as a teremp can be used to prevent jumping-out of the cartridge 14.

On the other hand, a circular hole 216 is formed at the center of the bottom surface of the cartridge accommodating portion 206. At the bottom portion in the vicinity of the circular hole 216 of the cartridge accommodating portion 206 and at the position which opposes the indicating piece 38 of the accommodated cartridge 14, a pin 218 serving as an indicated state changing pin is formed integrally with the main body 202 by a synthetic resin. Further, as shown in FIG. 2, an accommodation number 206B (1 through 20 in the present embodiment) of the cartridge accommodating portion 206 is applied to a concave circular plate portion of the main body 202.

As illustrated in FIG. 9, the pin 218 is formed in the shape of a truncated cone in which the apex of a cone is removed. In other words, the proximal end portion of the pin 218 is formed larger than the distal end portion thereof and the cross sectional surface thereof is formed in the circular shape.

As a result, when the cartridge 14 is pressed toward the cartridge accommodating portion 206 by more than a predetermined force, the indicating piece 38 and the auxiliary indicating piece 39, which are pressed by the pin 218, are bent to the interior of the notch opening 36.

The cartridge 14, in which the indicating piece 38 and the auxiliary indicating piece 39 are bent to the interior of the notch opening 36, indicates that the negative film F within the cartridge 14 has been developed.

As illustrated in FIG. 3, at the portion of the main body 202 on the side opposite the side to which the cover 204 is mounted, a ring gear 220 having a large diameter and a slit circular plate 222 are coaxially provided.

When the container 200 is mounted to a film separating device and a film connecting device (both of them unillustrated), the ring gear 220 is used for engaging with gears of these devices and rotating the container 200.

At the positions of the slit circular plate 222 which correspond to the cartridge accommodating portions 206, twenty slits 224 serving as position confirming portions for positioning are formed. One of the slits 224 is formed wide and serves as a slit 224A for reference which is used for positioning the container 200 in the rotating direction thereof.

By disposing the slit 224A for reference at the position corresponding to the cartridge accommodating portion 206 whose accommodation number 206A is 1, when the container 200 is mounted to the film separating device and the film connecting device, the No. 1 position of the plurality of cartridges 14 which have been accommodated can be detected and checked by optical sensors (unillustrated) provided in these devices.

The other slits 224 and the slit 224A, which shows an origin, are detected by the optical sensors and the slits 224 are counted. Consequently, the cartridges 14 within the cartridge accommodating portions 206 are successively checked.

Figure 4:
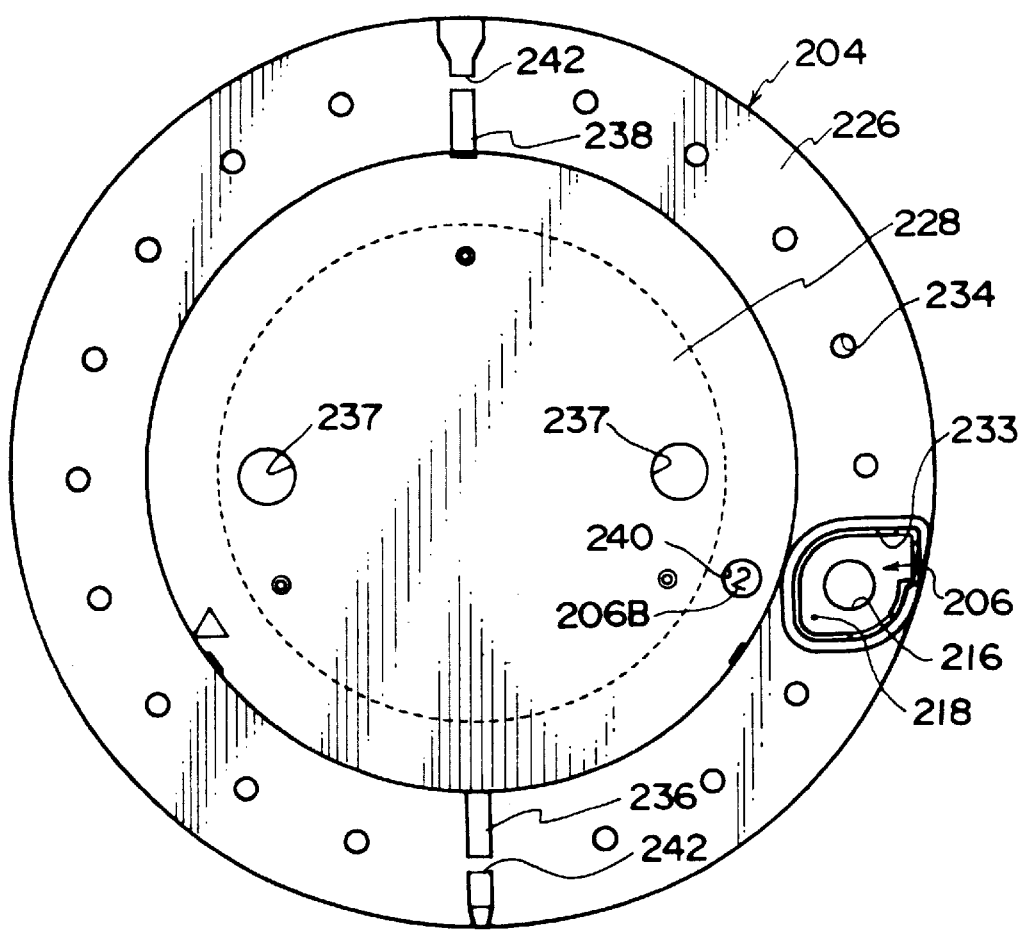
FIG. 4 is an elevational view which, seen from the cover side, shows the container relating to the embodiment of the present invention.

On the other hand, as shown in FIGS. 2 through 4, the cover 204 is formed by a ring-shaped presser plate 226 and a circular plate-shaped lock plate 228 for mounting the cover 204 to the main body 202. The lock plate 228 is mounted to the inner circumferential portion of the presser plate 226 so that the lock plate 228 is relatively rotatable with respect to the presser plate 226. Engaging pawls 230 are provided at three positions of the outer circumferential side of the lock plate 228. These engaging pawls 230 are inserted through notches 232 provided at the main body 202. By inserting these engaging pawls 230 through the notches 232 in the axial direction of the main body 202, and by relatively rotating the lock plate 228 and the main body 202, the engaging pawls 230 engage the main body 202 and the cover 204 is mounted to the main body 202.

Accordingly, the engaging part, which engages the cover 204 with the main body 202 and which removably mounts the cover 204 to the main body 202, is formed by the engaging pawls 230 and the notches 232. Holes 237 for inserting a finger at the time of rotating the lock plate 228 are formed integrally with the lock plate 228.

As shown in FIG. 1, on the presser plate 226, a projection 236 extends along the radial direction of the presser plate 226 and the distal end at the outer circumferential side thereof is tapered. Also a projection 238, is provided at the side opposite the projection 236 and the outer circumferential side thereof includes a wide portion.

When the container 200 is mounted to the film separating device and the film connecting device, the projections 236, 238 serve as engaging portions engage the concave portions that (unillustrated) of the devices and are used for positioning the container 200 within the devices.

A hooking groove 242, which hooks on a rubber band (or a string and the like), is formed in the projections 236, 238, such that a DP bag, which corresponds to the cartridge 14 processed at the container 200, can be tied with the rubber band (or the string and the like).

An opening 233, which allows the cartridge, 14, to be placed into and taken out from the container is formed in the presser plate 226. Small holes 234 are formed in portions of the presser plate 226 other than the projections 236, 238 at a pitch which is the same as that of the cartridge accommodating portions 206. Further, a window 240 for indicating the accommodation number 206B of the cartridge accommodating portion 206 which corresponds to the opening 233 is formed in the presser plate 226.

The above-described film separating device is a device for removing the negative film F from the cartridge 14, and the film connecting device is a device for mounting the negative film F to the cartridge 14. When the cartridge 14 is inserted into the film separating device, the negative film F is removed from the cartridge 14 and the emptied cartridge 14 is accommodated within the container 200. Thereafter, the container 200 is moved from the film separating device to the film connecting device in which, the developed negative film F is mounted to the emptied cartridge 14.

Next, the operation of the first embodiment will be explained.

When the container 200, which is formed so as to be able to accommodate plurality of cartridges 14, is mounted to the film separating device and the film connecting device, the projections 236, 238 of the container 200 engage the concave portions of the devices, and are mounted therein. The cartridges 14, from which the negative films F have been removed by the film separating device, are accommodated within the container 200 by the film separating device. Moreover, in the film connecting device, the negative films F, which have been temporarily removed and developed, are mounted to the cartridges 14 accommodated within the container 200. Further, a pin 218, which can change the indicated states of the indicating piece 38 and the auxiliary indicating piece 39, is formed at the interior of each of the plurality of cartridge accommodating portions 206.

As described above, when the cartridge 14 is accommodated within the container 200, the pin 218 abuts the indicating piece 38 of the cartridge 14 and the auxiliary indicating piece 39 thereof which indicate the state of the negative film F accommodated within the cartridge 14. The indicating piece 38 and the auxiliary indicating piece 39 are bent so as to change the indicated states of the indicating piece 38 and the auxiliary indicating piece 39. The pin 218 is formed in the shape of a truncated cone in which the proximal end portion of the pin 218 is larger than the distal end portion thereof.

Figure 11:
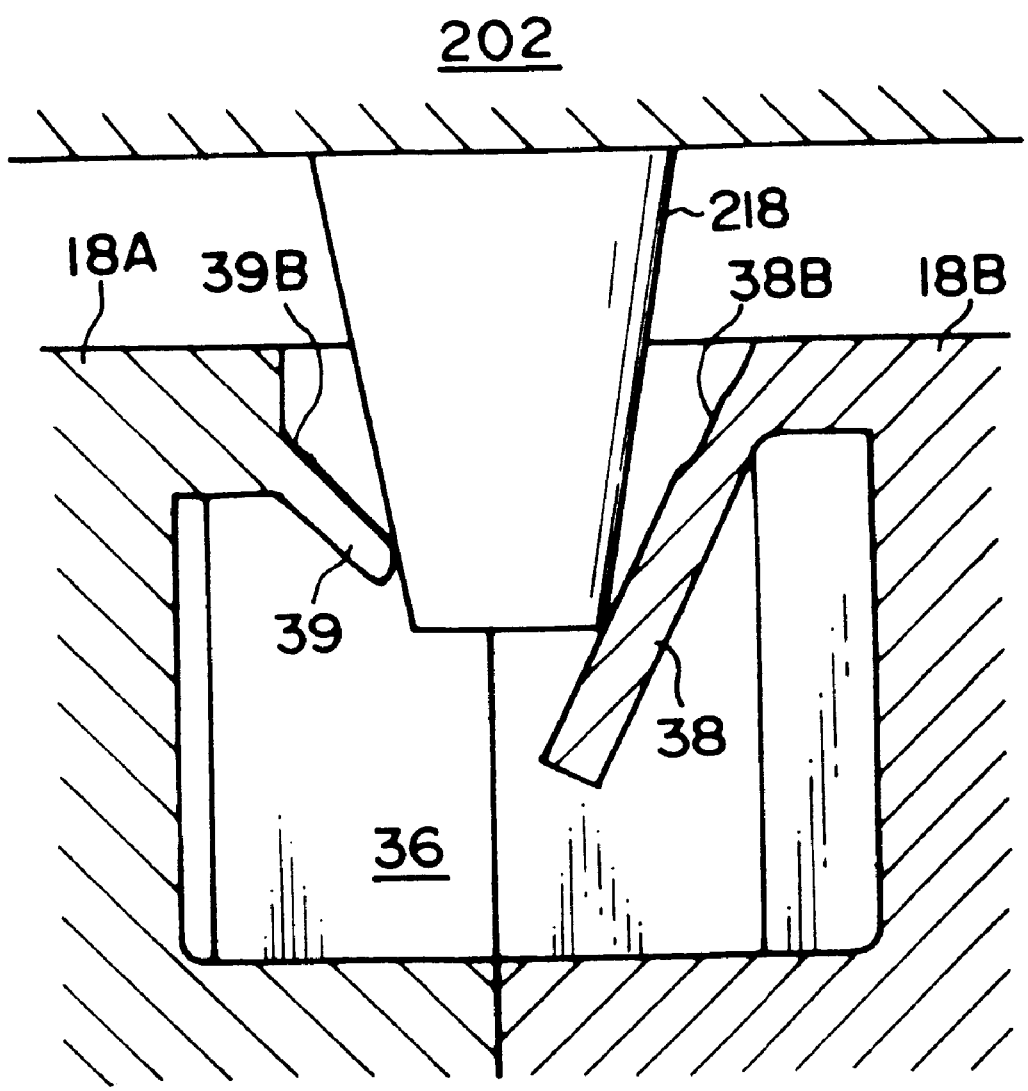
FIG. 11 is an enlarged cross-sectional view which, similar to FIG. 9, shows a state in which the pin is inserted through a notch opening.

Accordingly, as illustrated in FIG. 11, the auxiliary indicating piece 39 in particular is bent while abutting the side surface of the pin 218 formed in the shape of a truncated cone, and the indicating piece 38 is also bent while abutting the pin 218 which distal end portion is tapered. Therefore, even if the moving speed of the pin 218 is constant, the indicating piece 38 and the auxiliary indicating piece 39 are bent slower than the case of using a straight pin which is formed linearly. As a result, the speed at which the indicating piece 38 and the auxiliary indicating piece 39 are deformed is slower so that the pieces 38, 39 are bent slowly. Separation of the indicating piece 38 and the auxiliary indicating piece 39 from the cartridge 14 is prevented, and the indicating piece 38 and the auxiliary indicating piece 39 are reliably bent to the necessary depth.

At this time, the cartridge 14 is moved by the film separating device so that the pin 218 abuts the indicating piece 38 and the auxiliary indicating piece 39. The indicating piece 38 of the cartridge 14 and the auxiliary indicating piece 39 thereof and the pin 218 are moved relatively. After the pin 218 abuts the indicating piece 38 and the auxiliary indicating piece 39, the pin 218 reduces the speed of relative movement by the film separating device with respect to the speed before the abutment, and can bend the indicating piece 38 and the auxiliary indicating piece 39.

By using such method, the speed of relative movement after the pin 218 abuts the indicating piece 38 and the auxiliary indicating piece 39 is reduced with respect to the speed before the abutment, and the speed of deformation is reduced so that the indicating piece 38 and the auxiliary indicating piece 39 are bent more slowly. While separation of the indicating piece 38 and the auxiliary indicating piece 39 from the cartridge 14 is reliably prevented, the indicating piece 38 and the auxiliary indicating piece 39 are reliably bent to the necessary depth.

As mentioned above, when the cartridge 14 is accommodated within the cartridge accommodating portion 206, the indicating piece 38 and the auxiliary indicating piece 39 are bent. Thus, there is no need to have a mechanism, for bending the indicating piece 38 and the auxiliary indicating piece 39, which has bendable structures and a work space for bending them. The cost is thereby reduced.

Figure 12:
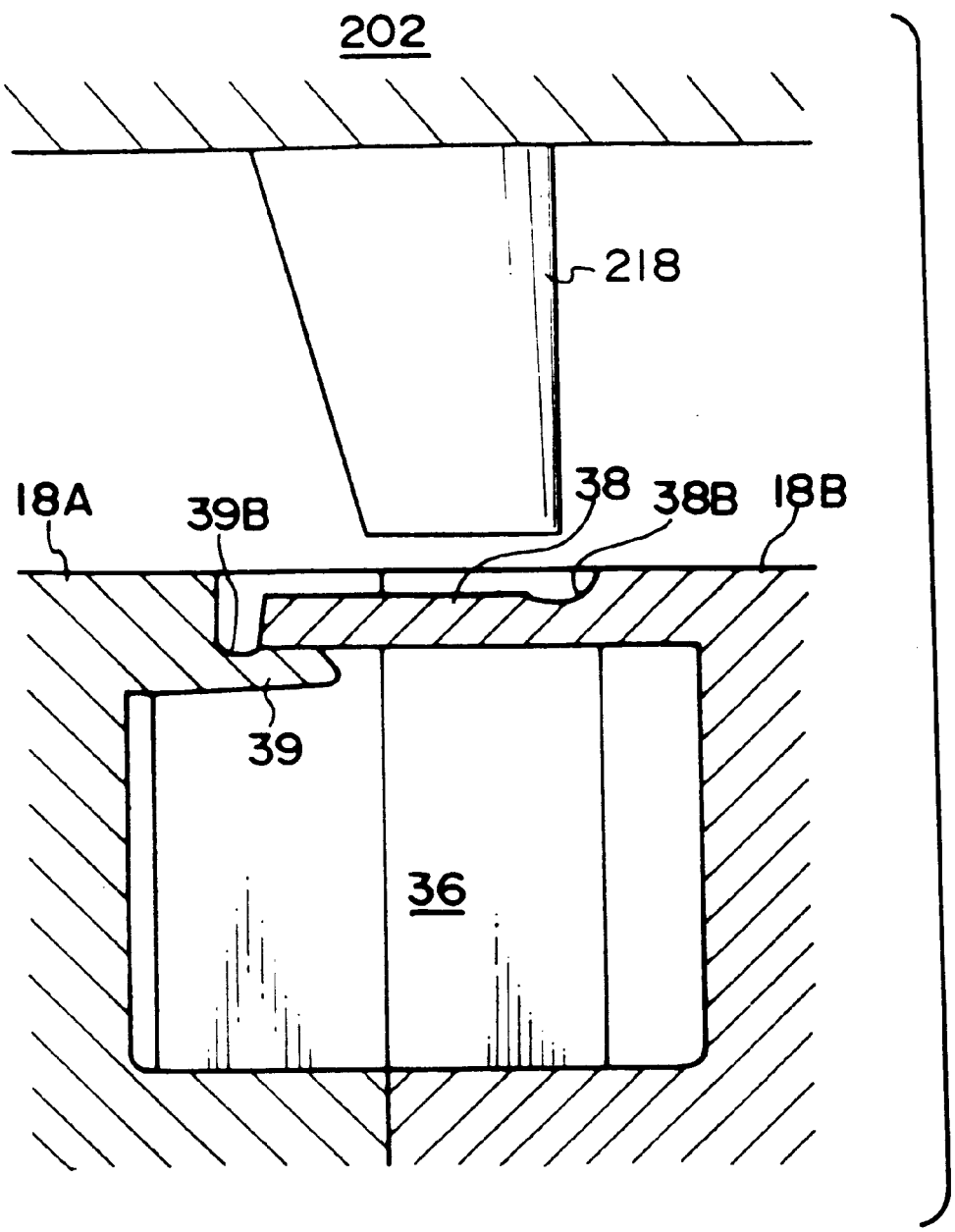
FIG. 12 is an enlarged cross-sectional view which, similar to FIG. 9, shows the peripheries of a cartridge and a pin relating to a variant example of the first embodiment.

Further, as a variant example of the first embodiment, as illustrated in FIG. 12, the pin 218 may be formed in that only the left side of the pin 218 which is the side abutting the auxiliary indicating piece 39, which is considered in particular easily separated, is tapered, and the right side thereof is linearly formed. Thus, the proximal end portion of the pin 218 is formed larger than the distal end portion thereof. Accordingly, when the indicating piece 38 and the auxiliary indicating piece 39 are pressed by the pin 218 so as to be bent and separated, pressing force of the pin 218 does not act on the auxiliary indicating piece 39. In this case, the cross sectional surface of a pin 218 is formed in the non-circular shape. Thus, even if the pin 218 has a structure shown in FIG. 12, the operation of the variant example is the same as that of the first embodiment.

Next, an indicated state changing pin and a method of bending indicating pieces relating to a second embodiment of the present invention will be explained on the basis of FIGS. 13 through 15. Members which are the same as those described in the first embodiment are denoted by the same reference numerals, and redundant descriptions thereof are omitted.

Figure 13:
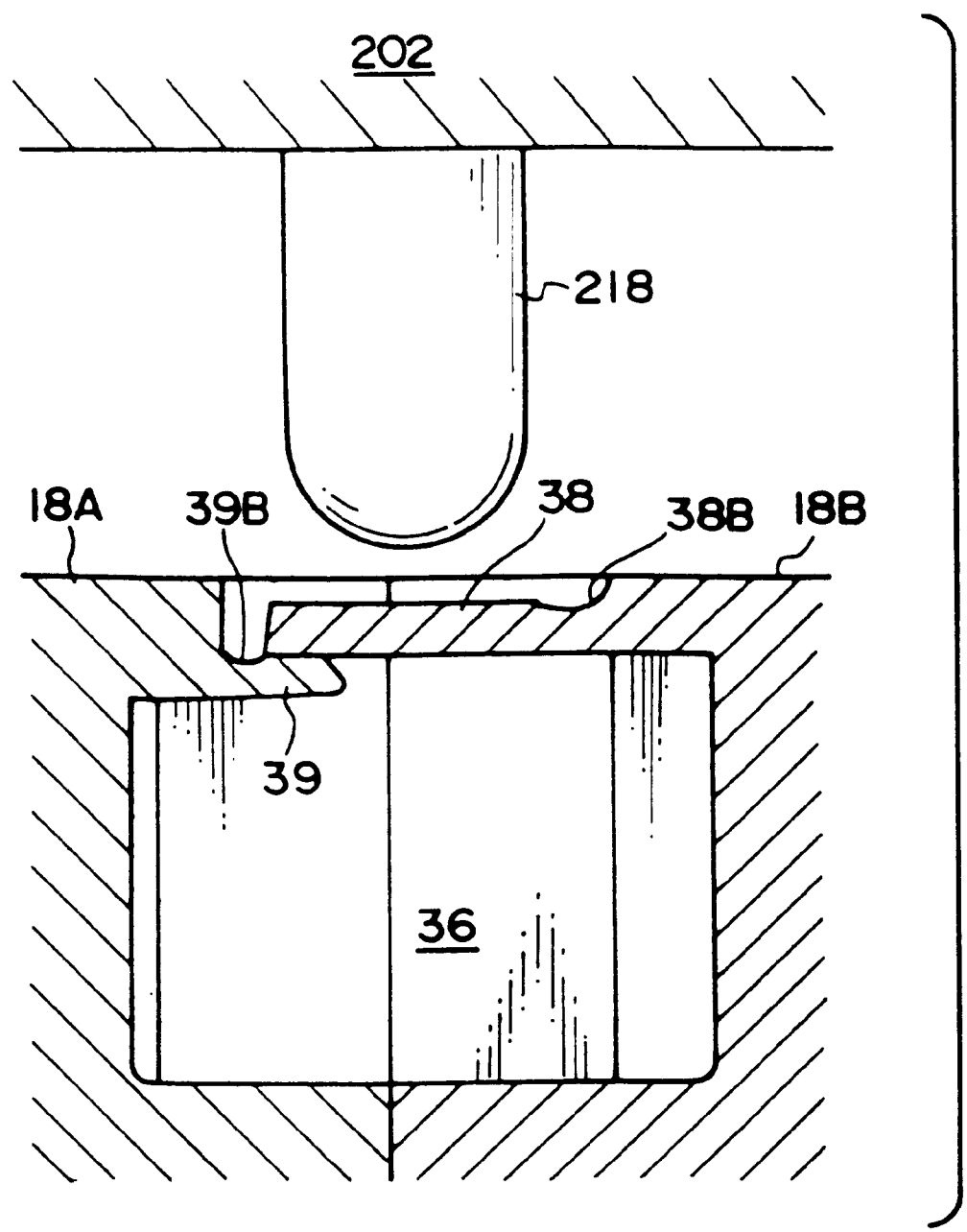
FIG. 13 is an enlarged cross-sectional view which, similar to FIG. 9, shows the peripheries of a cartridge and a pin relating to a second embodiment.

As illustrated in FIG. 13, similarly to the first embodiment, a pin 218, which abuts and bends an indicating piece 38 and an auxiliary indicating piece 39 of the second embodiment, is formed integrally with a main body 202 by a synthetic resin. However, the distal end portion of the pin 218 is spherical. As a result, the longitudinal sectional surface of the distal end portion of the pin 218 is formed in the shape of an arc.

Accordingly, the indicating piece 38 and the auxiliary indicating piece 39 are bent while abutting the arc-shaped surface of the pin 218. Therefore, similarly to the first embodiment, even if the speed at which the pin 218 moves is constant, the indicating piece 38 and the auxiliary indicating piece 39 are bent slower than the case of using a straight pin which is formed linearly. As a result, deformation speed of the indicating piece 38 and the auxiliary indicating piece 39 is slower so that the pieces 38, 39 are bent slowly. Separation of the indicating piece 38 and the auxiliary indicating piece 39 from the cartridge 14 is prevented, and the indicating piece 38 and the auxiliary indicating piece 39 are reliably bent to the necessary depth.

Figure 14:
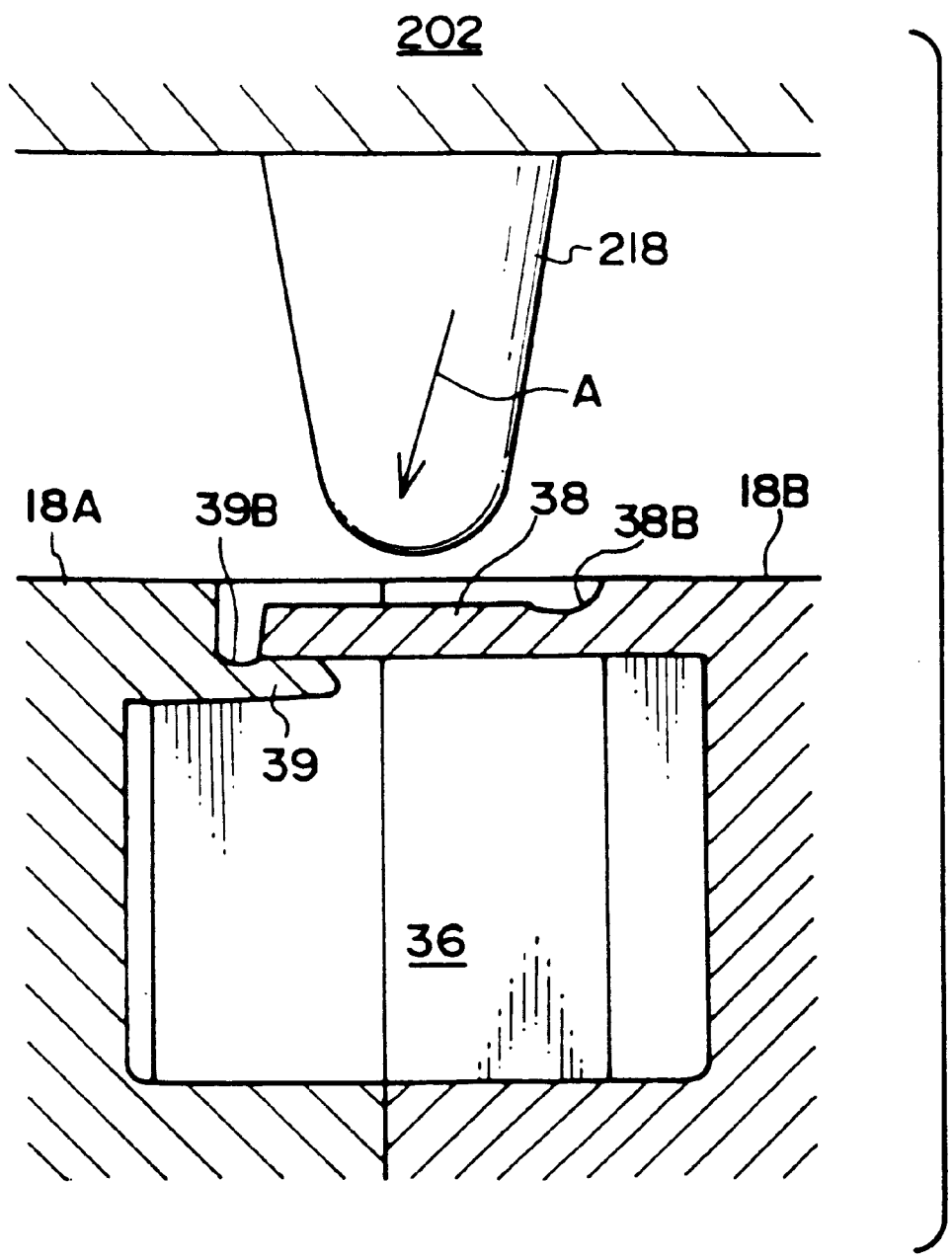
FIG. 14 is an enlarged cross-sectional view which, similar to FIG. 9, shows the peripheries of a cartridge and a pin relating to a first variant example of the second embodiment.

Further, as a first variant example of the second embodiment, as illustrated in FIG. 14, the pin 218 may be formed in that the distal end portion of the pin 218 is spherical and the side surface thereof is tapered, such that the proximal end portion of the pin 218 is larger than the distal end portion thereof. Even if the pin 218 having the structure shown in FIG. 14 is formed, the operation of the first variant example is the same as that of the second embodiment.

Figure 15:
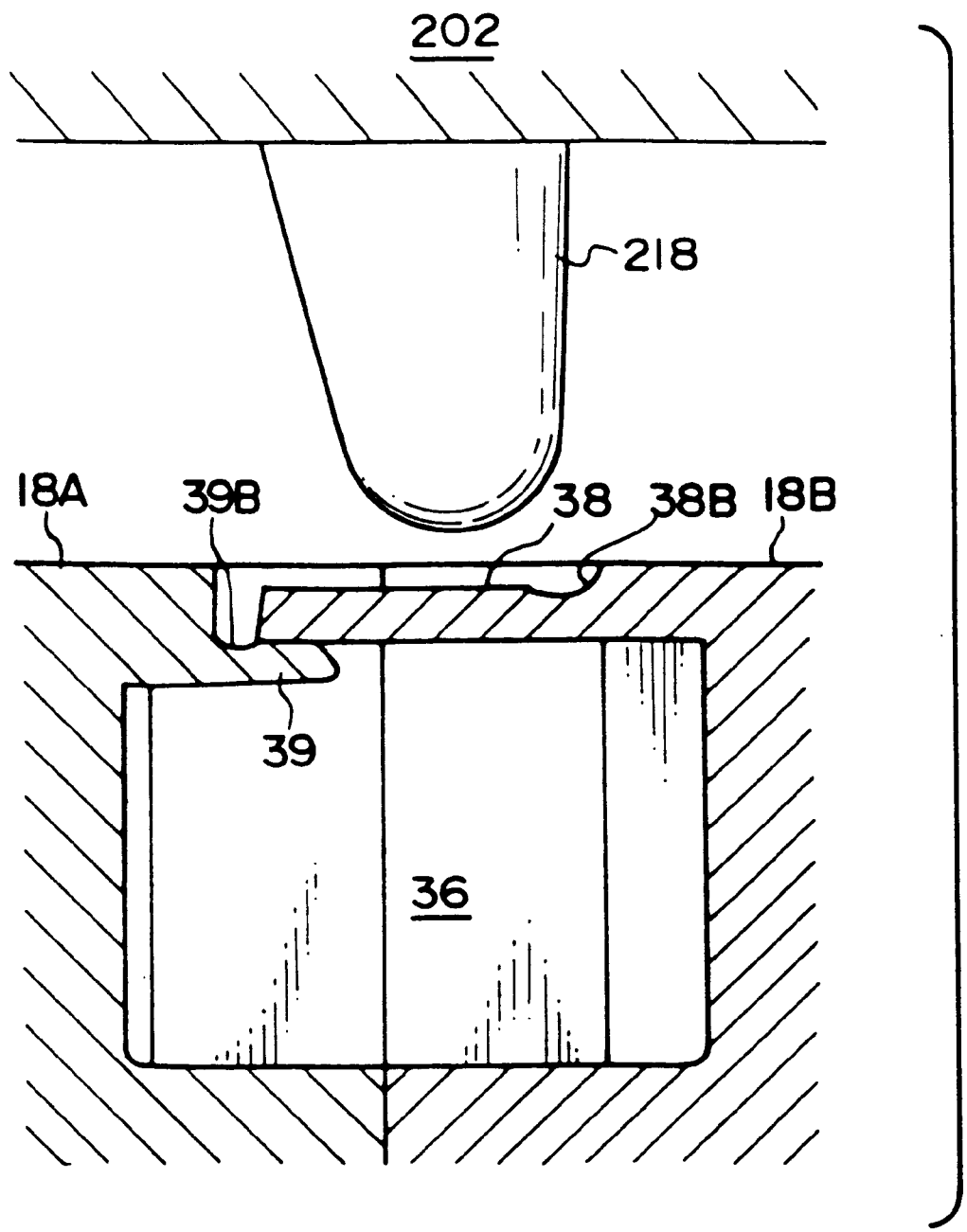
FIG. 15 is an enlarged cross-sectional view which, similar to FIG. 9, shows the peripheries of a cartridge and a pin relating to a second variant example of the second embodiment.

On the other hand, as a second variant example of the second embodiment, as illustrated in FIG. 15, the pin 218 may be formed in that the distal end portion of the pin 218 is spherical, and only the left side of the pin 218 which is the side abutting the auxiliary indicating piece 39, which is considered easily separated in particular, is tapered, and the right side of the pin 218 is linearly formed. Thus, the proximal end portion of the pin 218 is formed larger than the distal end portion thereof. Even if the pin 218 has a structure shown in FIG. 15, the operation of the second variant example is the same as that of the second embodiment.

Next, an indicated state changing pin and a method of bending indicating pieces relating to a third embodiment of the present invention will be explained. Members which are the same as those described in the first embodiment are denoted by the same reference numerals, and redundant descriptions thereof are omitted.

Firstly, a base end 38B of an indicating piece 38 of a cartridge 14 and a base end 39B of an auxiliary indicating piece 39 thereof are heated by, for example, hot air, infrared beam or the like. In the heated state, a pin 218, which can change the indicated states of the indicating piece 38 and the auxiliary indicating piece 39, abuts and bends the indicating piece 38 and the auxiliary indicating piece 39.

Since the pin 218 abuts the indicating piece 38 and the auxiliary indicating piece 39 in a state in which the base end 38 of the indicating piece 38 and the base end 39Be of the auxiliary indicating piece 39 are heated so as to be easily bent, separation of the indicating piece 38 and the auxiliary indicating piece 39 from the cartridge 14 is prevented, and at the same time, the indicating piece 38 and the auxiliary indicating piece 39 are reliably bent to the necessary depth.

The embodiments of the present invention show examples to which the present invention was applied. The structures of the present invention are not limited to these, and various other structures are possible in the present invention.

For example, in the aforementioned first embodiment, the speed at which the cartridge 14 is inserted into the container 200 is reduced. However, the cartridge 14 may be inserted at a constant speed. Also, the manufacturer, the material and other information of the cartridge 14 is read from the bar code, and the inserting speed of every cartridge 14 may be changed.

Further, in the aforementioned second embodiment, the distal end portion of the pin 218 may be spherical. However, instead of the spherical shape, the configuration of the distal end portion thereof may be simply rounded. When the indicating piece 38 and the auxiliary indicating piece 39 are bent by the pin 218, the position at which the pin 218 presses and the configuration of the pin 218 may be adjusted or the like, so that the pin 218 abuts only the indicating piece 38 and does not directly abut the auxiliary indicating piece 39.

Moreover, when the pin 218 is moved to the indicating piece 38 side and presses the indicating piece 38 and the auxiliary indicating piece 39 into the notch opening 36, for example, the pin 218 may be diagonally moved, for example, along the direction of arrow A in FIG. 14.

Further, in the aforementioned embodiments, twenty cartridge accommodating portions 206 are provided at one container 200. However, the number is not limited to the same, and smaller or larger number of cartridge accommodating portions 206 may be formed.

What is claimed is:

1. A combination of a film cartridge and a film cartridge accommodating container, the combination comprising:

a film cartridge having indicating pieces which are formed integrally with a casing of the film cartridge, and which indicate a development state of a photographic film accommodated within the film cartridge;

a film cartridge accommodating container which accommodates the film cartridge;

an indicated state changing pin including a pin main body having (1) a proximal end formed integrally with and projecting from the film cartridge accommodating container, and (2) a distal end formed opposite to the proximal end along a longitudinal axis of the pin;

wherein an outer surface of the pin main body between the proximal end and the distal end decreases in diameter from the proximal end to the distal end; and wherein, when the film cartridge is inserted into the film cartridge accommodating container, the distal end and then the outer surface of the pin main body contact the indicating pieces and bend the indicating pieces inward into an interior notch opening of the film cartridge to indicate that the photographic film within the film cartridge has been developed.

2. The combination according to claim 1, wherein the pin main body is tapered from the proximal end to the distal end.

3. The combination according to claim 2, wherein the pin main body is formed in a shape of a truncated cone with the distal end having a planar outer surface.

4. The combination according to claim 2, wherein the distal end has a spherical outer surface.

5. The combination according to claim 1, wherein the distal end has one of a spherical and an arcuate outer surface.

6. The combination according to claim 2, wherein the distal end has one of a spherical and an arcuate outer surface.

7. The combination according to claim 2, wherein the pin main body, extending from the proximal end to the distal end, is inclined at an angle relative to a longitudinal axis of the pin.

8. The combination according to claim 7, wherein the distal end has one of a spherical and an arcuate outer surface.

9. The combination according to claim 7, wherein the pin main body is formed in a shape of an inclined truncated cone with the distal end having a planar outer surface.

10. The combination according to claim 1, wherein the pin main body has only one side tapered from the proximal end to the distal end, with the distal end having a planar outer surface.

11. The combination according to claim 1, wherein the pin main body has only one side tapered from the proximal end to the distal end, with the distal end having a spherical outer surface.

* * * * *